US007559016B1

(12) United States Patent
Rakowski et al.

(10) Patent No.: US 7,559,016 B1
(45) Date of Patent: Jul. 7, 2009

(54) SYSTEM AND METHOD FOR INDICATING WEB PAGE MODIFICATIONS

(75) Inventors: Brian D. Rakowski, Menlo Park, CA (US); Darick M. Tong, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 347 days.

(21) Appl. No.: 10/961,786

(22) Filed: Oct. 7, 2004

(51) Int. Cl.
*G06F 17/00* (2006.01)

(52) U.S. Cl. ............... 715/229; 715/234; 715/760; 715/205; 715/206; 715/207; 715/208; 715/209; 715/204

(58) Field of Classification Search .......... 715/511, 715/513, 760, 229, 234, 205–209
See application file for complete search history.

(56) References Cited

U.S. PATENT DOCUMENTS

| | | | |
|---|---|---|---|
| 5,208,748 A | 5/1993 | Flores et al. | 704/1 |
| 5,216,603 A | 6/1993 | Flores et al. | 704/1 |
| 5,613,108 A | 3/1997 | Morikawa | 393/616 |
| 5,734,837 A | 3/1998 | Flores et al. | 705/7 |
| 5,948,058 A | 9/1999 | Kudoh et al. | 709/206 |
| 6,088,707 A * | 7/2000 | Bates et al. | 715/501.1 |
| 6,185,551 B1 | 2/2001 | Birrell et al. | 707/3 |
| 6,219,818 B1 * | 4/2001 | Freivald et al. | 714/799 |
| 6,366,933 B1 * | 4/2002 | Ball et al. | 715/511 |
| 6,374,272 B2 * | 4/2002 | Bates et al. | 715/207 |
| 6,571,295 B1 | 5/2003 | Sidana | |
| 6,834,306 B1 * | 12/2004 | Tsimelzon | 709/228 |
| 6,981,225 B1 * | 12/2005 | Gaudette | 715/764 |
| 2001/0016858 A1 * | 8/2001 | Bates et al. | 707/513 |
| 2003/0233419 A1 | 12/2003 | Beringer | 709/206 |
| 2004/0205514 A1 * | 10/2004 | Sommerer et al. | 715/501.1 |

FOREIGN PATENT DOCUMENTS

WO WO 00/23931 4/2000

(Continued)

OTHER PUBLICATIONS

Millholon et al, Microsoft Office Word 2003 Inside Out, Nov. 5, 2003, pp. 1-4.*

(Continued)

*Primary Examiner*—Stephen S Hong
*Assistant Examiner*—David Faber
(74) *Attorney, Agent, or Firm*—Morgan, Lewis & Bockius LLP

(57) ABSTRACT

Users are shown how a web page has been modified from a previous version. Information related to differences between the current version of the web page and a previous version of the web page is provided in response to user-initiated activity within a predefined region of the current version of the web page. In some embodiments, when a user attempts to activate a feature of the web page at a location associated with a former location of the feature in a previous version of the page, the feature is activated, but update information related to the differences between the previous and current versions of the web page is displayed over at least a portion of the information generated by activation of the feature. In some embodiments, the user is required to perform a specific action in order to clear the display of the update information.

26 Claims, 7 Drawing Sheets

FOREIGN PATENT DOCUMENTS

WO     WO 01/11503 A2    2/2001

OTHER PUBLICATIONS

Microsoft TechNet, "Internet Explorer 4 Resource Kit Chapter 33—Accessibility Features and Functionality", Microsoft, printed on Mar. 14, 2007, pp. 1-17, http://www.microsoft.com/technet/archive/ie/reskit/ie4/Part8/part8b.mspx?pf=true.*

Thurrott, Paul, "Internet Explorer 4.01 now available", Dec. 2, 1997, WindowsITPro, pp. 1-2, http://www.windowsitpro.com/articles/print.cfm?articleid=17493.*

Microsoft Word 2000, copyrighted 1999, Microsoft, p. 1-7.*

Microsoft, Microsoft Computer Dictionary, May 1999, Microsoft Press, Fourth Edition, p. 224-225.*

Raggett et al, HTML 4.01 Specification, Dec. 24, 1999, W3C, p. 1, and Section 12 (1-12).*

CNN.com, CNN.com, published as early of Mar. 31, 2003, CNN, pp. 1-2, Screenshots 1-3 (total pages: 5), http://web.archive.org/web/20030331131808/http://www.cnn.com/.*

Comer, D. and Peterson, L., "Conversation-Based Mail," ACM Transactions on Computer Systems (TOCS) vol. 4, Issue 4, pp. 299-319, Nov. 1986.

Bellotti, V et al., (2003), "Taking Email to Task: the design and evaluation of a task management centered email tool." In Conference Proceedings on Human Factors in Computing Systems (CHI2003), pp. 345-352, Apr. 5-10, 2003, Fort Lauderdale, Florida.

Bellotti, V. et al., "Taskmaster: recasting email as task management," PARC, CSCW '02 Workshop on Redesigning Email for the 21st Century.

Flores, F. et al., "Computer Systems and the design of organizational interaction," ACM Transactions on Information Systems., pp. 153-172, (1988).

Shepherd, A. et al., "Strudel-an extensible electronic conversation toolkit," Proceedings of the 1990 ACM Conference on Computer-supported Cooperative Work, Los Angeles, California, United States, pp. 93-104.

Venolia, G., et al., "Supporting Email Workflow," Technical Report MSR-TR-2001-88, Microsoft Corporation, 10 pages (Sep. 2001).

Winograd, T., (1987), "A language/action perspective on the design of cooperative work," Human-Computer Interaction, vol. 3 No. 1, pp. 3-30, (1987-1988). Earlier version presented at the Conference on Computer-supported Cooperative Work, Austin, pp. 203-220, Dec. 1986.

Winograd, T., "Where the Action is," pp. 256A-260, Byte, Dec. 1988.

Zawinski, J., "Message Threading," http://www.jwz.org/doc/threading.html, pp. 1-9 (1997-2000).

* cited by examiner

SYSTEM AND METHOD FOR INDICATING WEB PAGE MODIFICATIONS

TECHNICAL FIELD

The disclosed embodiments relate generally to displaying documents. More particularly, the disclosed embodiments relate to indicating modifications to web pages.

BACKGROUND

As a result of frequent use of a web page, computer users may expect a particular feature in the web page (e.g., a hyperlink) to appear at a particular location. If the feature is moved to a new location, users may have difficulty finding and using the feature in its new location. Thus, there is a need to help users adjust to changes in web page features.

SUMMARY

In one aspect of the invention, a current version of a web page is displayed. Further, in response to user-initiated activity within a predefined region of the current version of the web page, information related to differences between the current version of the web page and a previous version of the web page is also displayed. In some embodiments, the information is superimposed over at least a portion of web page, and the user is required to perform a specific action to clear the information from the displayed web page.

BRIEF DESCRIPTION OF THE DRAWINGS

The aforementioned aspect of the invention, as well as additional aspects and embodiments thereof will be more clearly understood hereinafter as a result of a detailed description of embodiments of the invention when taken in conjunction with the drawings. Like reference numerals refer to corresponding parts throughout the several views of the drawings.

DESCRIPTION OF EMBODIMENTS

Methods, systems, and graphical user interfaces are described that show users how a web page (i.e., an electronic document created using HTML, XML, SGML or other similar language) has been modified. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention as defined by the appended claims.

Moreover, in the following description, numerous specific details are set forth or provide a thorough understanding of the present invention. However, it will be apparent to one of ordinary skill in the art that the invention may be practiced without these particular details. In other instances, methods, procedures, components, and networks that are well-known to those of ordinary skill in the art are not described in detail to avoid obscuring aspects of the present invention.

Figure 1:
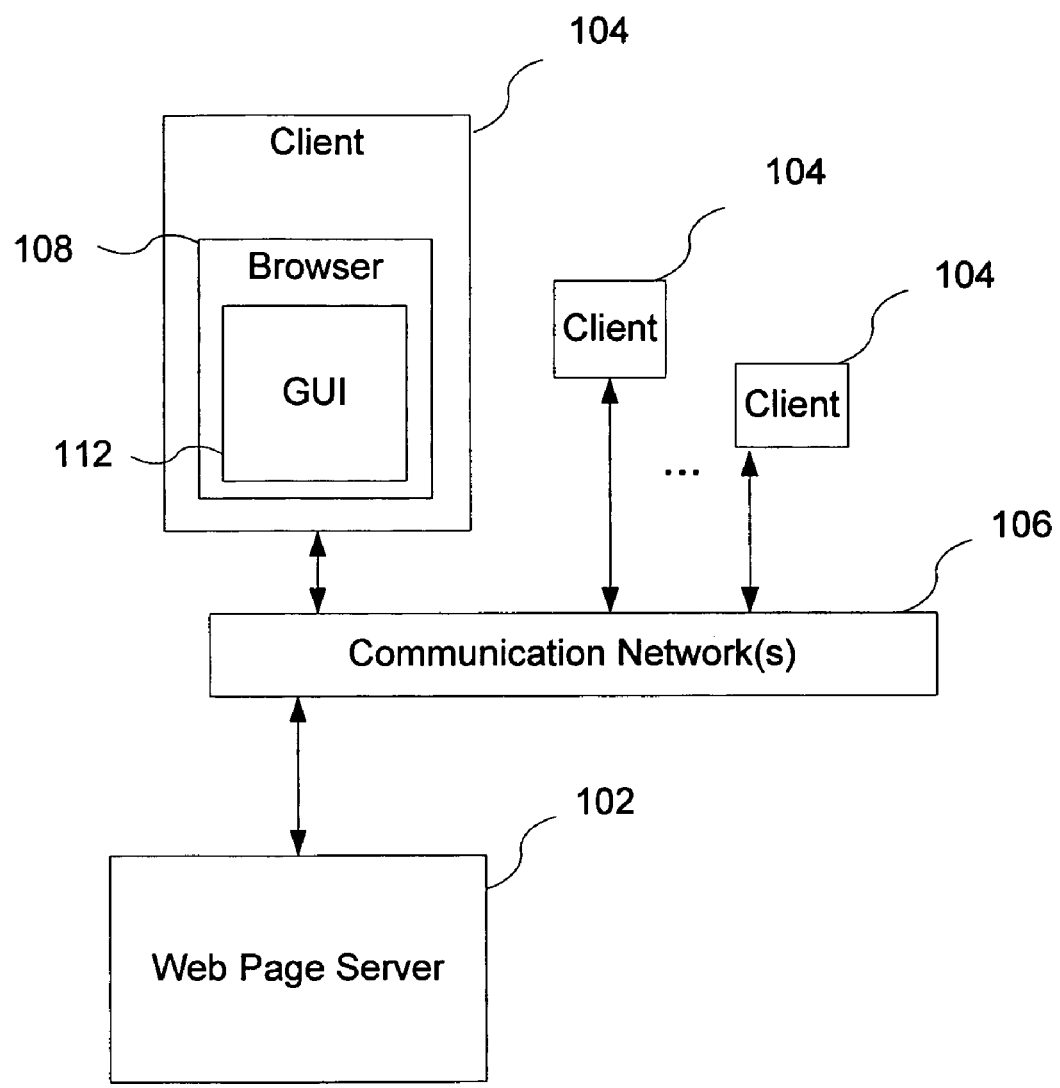
FIG. 1 is a block diagram illustrating an exemplary distributed computer system according to an embodiment of the invention.

FIG. 1 is a block diagram illustrating an exemplary distributed computer system according to one embodiment of the invention. This system includes client computers 104, web page server 102, and communication network(s) 106 for interconnecting these components. Client 104 includes browser 108 with graphical user interface (GUI) 112. Client 104 sends a request for a web page via communication network 106 to server 102. In response, web page server 102 retrieves the current version of the requested web page and sends it back to client 104 via communication network 106. GUI 112 displays the web page. If features in the current version of the web page (e.g., the location of navigation regions, search bars, hyperlinks, form fields or any other web page feature or location that a user might select, e.g., by clicking or hovering) have changed, the web page may include information related to differences between the current version of the web page and a previous version of the web page. The information allows the differences to be displayed to a viewer of the web page in response to viewer-initiated activity within a predefined region of the current version of the web page. In some embodiments, browser 108 uses the information to display the differences and respond to the viewer-initiated activity. In some embodiments, the information is provided as a series of instructions which are executed by browser 108. The instructions may be provided in any number of different browser-executed languages, link in the current version of the web page, when selected by the user, may initiate the execution of instructions in a web server, thereby providing to the client 104 an "informational version" of the web page that includes information related to differences between the current and previous versions of the web page. Communications network(s) 106 may include the Internet and may also include one or more local area networks and/or wide area networks, and need not be described in detail because such networks are well known to those of ordinary skill in the art.

Although discussed in terms of web pages, the embodiments of the invention are not limited to web pages and could also apply to other types of content where information about the differences between the current version of the content and a previous version of the content can be indicated, using programmatic instructions, in an interactive manner in response to user-initiated activity within a predefined region of the current version of the content. The information about the differences can be presented in a number of ways. In some embodiments, the information about the differences can be presented as part of an electronic document.

In some embodiments, web page server 102 is implemented using a plurality of computers servers or processors. For instance, in a system that provides web pages for millions of users throughout the world, a distinct set of one or more servers may be used to provide services to users in each of several distinct geographic regions of the world.

Figure 2:
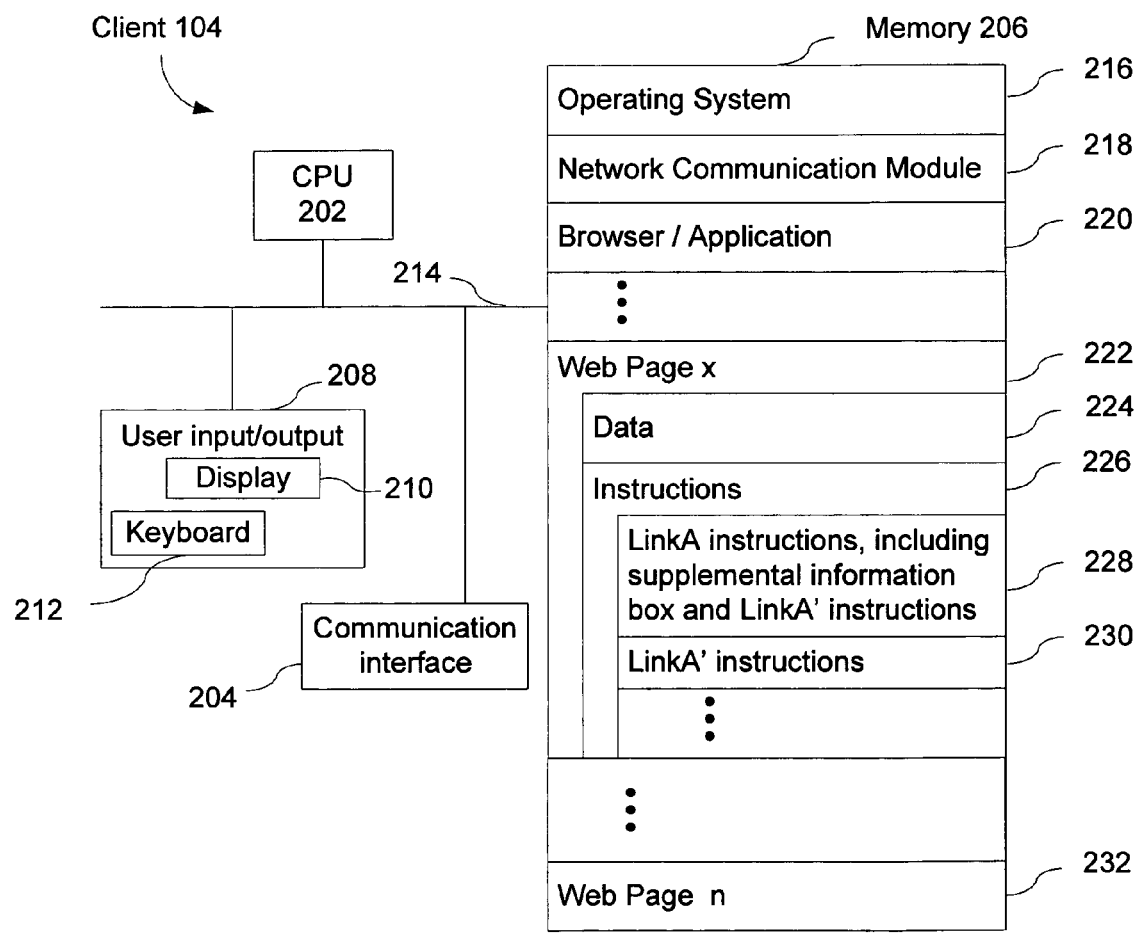
FIG. 2 is a block diagram illustrating an exemplary client computer 104 according to an embodiment of the invention.

FIG. 2 is a block diagram illustrating an exemplary embodiment of client 104. Client 104 generally includes one or more processing units (CPU's) 202, one or more network or other communication interfaces 204, memory 206, user input/output devices 208, and one or more communication buses 214 for interconnecting these components. The user input/output devices 208 may include a display 210, keyboard 212, mouse (not shown), touch pad (not shown), track ball, (not shown), pointing stick (not shown), or any subset of these, and furthermore may optionally include other types of devices as well.

Memory 206 may include high-speed random access memory and may also include non-volatile memory, such as one or more magnetic disk storage devices. Memory 206 may include mass storage that is remotely located from the central processing unit(s) 202.

In one embodiment, memory 206 stores operating system 216, network communication module 218, applications such as browser 220, and web pages such as web page×222 through web page n 232. Operating system 216 (e.g., LINUX, UNIX, or WINDOWS, or any other appropriate operating system) includes procedures for handling basic system services and for performing hardware dependent tasks. Network communication module 218 is used for communicating with server 102.

Exemplary web page 222 includes data 224 and instructions 226. For some web pages, the instructions 226 will include instructions, such as LinkA instructions 228, that are executed in response to some type of user-initiated activity within a predefined region in web page 222 when web page 222 is displayed in GUI 112. The user-initiated activity could be performed, for example, by a user who is viewing the web page. In some embodiments, the predefined region is the prior location of the feature in a previous version of the web page or an area near or surrounding the prior location. When executed, LinkA instructions 228 (described in more detail below) provide information to the user explaining how the feature in web page 222 has changed from earlier versions of web page 222. In some embodiments, LinkA instructions 228 also activate LinkA' instructions 230, thereby executing the feature as if the user had activated the feature from its current location in web page 222 in GUI 112. LinkA' instructions 230 execute the feature in response to user-initiated activity at or near the present location of the feature in the current version of web page 222. In one embodiment, the LinkA' instructions 230, when executed, access and display the user's email address book, or more accurately, these instructions generate and display a web page displaying a small portion of the user's email address book and providing links for accessing other portions of the user's address book. It is to be understood that this is but one example of a feature whose activation link may be moved from one position in a previous version of a web page to a new position in a current web page.

Figure 3:
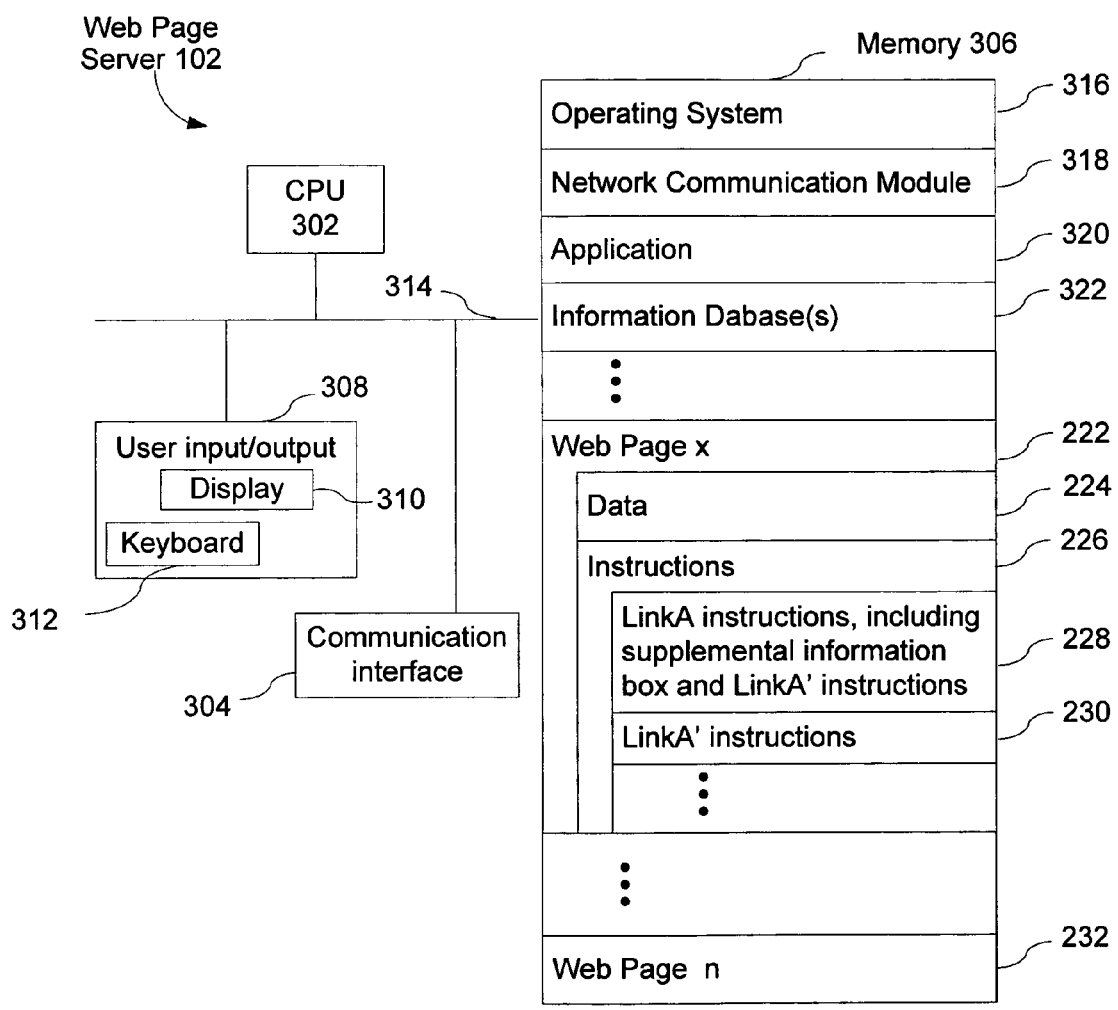
FIG. 3 is a block diagram illustrating an exemplary web page server 102 according to an embodiment of the invention.

FIG. 3 is a block diagram illustrating an exemplary embodiment of web page server 102. Web page server 102 generally includes one or more processing units (CPU's) 302, one or more network or other communication interfaces 304, memory 306, user input/output devices 308, and one or more communication buses 314 for interconnecting these components. The user input/output devices 308 may include a display 310, keyboard 312, mouse (not shown), touch pad (not shown), track ball, (not shown), pointing stick (not shown), or any subset of these, and furthermore may optionally include other types of devices as well. Memory 306, such as a machine readable medium, a computer-readable medium or a computer-readable media, may include high-speed random access memory and may also include non-volatile memory, such as one or more magnetic disk storage devices. Memory 306 may include mass storage that is remotely located from the central processing unit(s) 302. In one embodiment, memory 306 stores operating system 316 and network communication module 318. Operating system 316 includes procedures for handling basic system services and for performing hardware dependent tasks. Network communication module 318 is used for communicating with Client(s) 104. Web pages in server 102, such as web pages 222 and 232, are sent to client 104 via communications network 106 for display in GUI 112. These web pages 222, 232 may be generated by an application 320, such an email application, online shopping application, accounting application, or the like. These web pages may be constructed by accessing information in one or more information databases 322, which may be located either in the same server or in one or more other servers. Although FIG. 3 shows server 102 as a number of discrete items, FIG. 3 is intended more as a functional description of the various features which may be present in server 102 rather than as a structural schematic of the embodiments described herein. The actual number of servers in web page server 102 and how web pages are allocated among them will vary from one implementation to another, and may depend in part on the amount of data traffic that the system must handle during peak usage periods as well as during average usage periods.

Figure 4A:
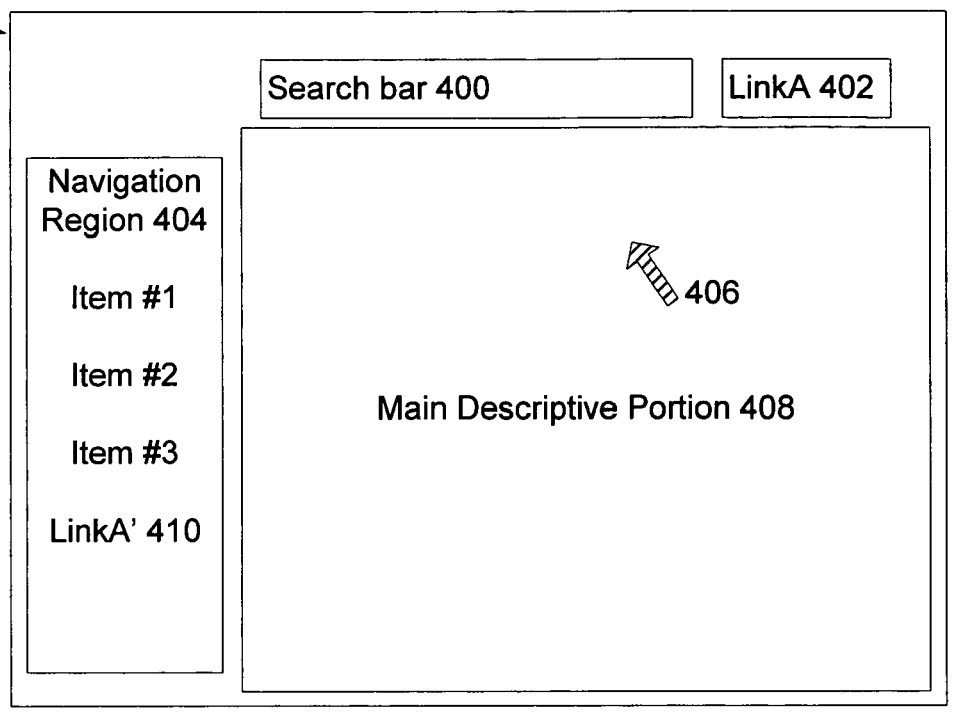
FIGS. 4A-4E are diagrams illustrating exemplary graphical user interfaces (GUI) 112 for a web page according to various embodiments of the invention.

FIGS. 4A-4E are diagrams illustrating exemplary graphical user interfaces (GUI) 112 for web page 222. Graphical user interfaces in which the present invention could be used includes the GUIs generated by a large variety of applications, including client based applications, server based applications and distributed applications that are executed in part on a server and in part on one or more client computers. Although only a few embodiments of GUI 112 are described, the concepts of the invention apply equally well to any type of graphical display of content and should therefore, not be limited to any particular graphical configuration illustrated in FIGS. 4A-4E. As illustrated in FIG. 4A, before user-initiated activity, an exemplary GUI 112 includes search bar 400, LinkA 402, navigation region 404, cursor 406, main descriptive portion 408, and LinkA' 410. In this example, LinkA 402 represents a feature that was placed next to search bar 400 in a previous version of web page 222 and that has been moved to navigation region 404 in current versions of web page 222. The current position of this feature is represented by "LinkA' 410" in FIG. A. Navigation region 404 can be a bar, panel, palette, or other similar area in GUI 112. Cursor 406 can be an arrow, pointer or other icon that can be used to point to commands (e.g., hyperlinks) on a web page. Main descriptive portion 408 can display many types of content, such as text, hypertext, pictures, and videos.

Figure 4B:
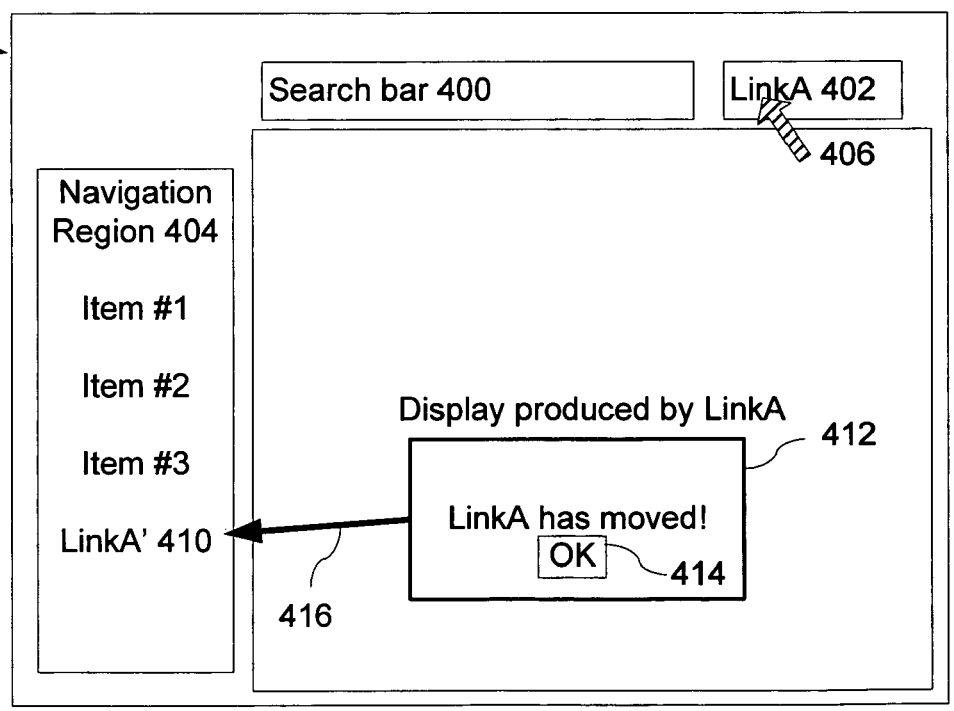

FIG. 4B illustrates the same GUI 112 after the user-initiated activity. Web page 222 displayed in GUI 112 may be configured so that the user-initiated activity must be performed within a predefined region of web page 222. For example, the user-initiated activity could be clicking on a link (e.g., LinkA 402) within the predefined region (e.g., clicking down and then up on a mouse button while a cursor is over the link, or just clicking down on the mouse, or just clicking up on the mouse), placing (or hovering) cursor 406 over or near the predefined region for a predetermined period of time (e.g., a mouse-hover), or other type of activity indicating that the user expects to activate the feature associated with the predefined region (e.g., a region associated with LinkA 402). One of ordinary skill in the art would recognize various way to identify a user-initiated activity as described above such as by recognizing a mouse-down event and/or mouse up event, or monitoring the movement of the mouse over a period of time. This could be done, for example, by the browser or operating system. The predefined region could be, for example, the link itself of an area surrounding the link or location where the feature was located in the previous version of web page 222.

As illustrated in FIG. 4B, information region 412 and, optionally, arrow 416 are displayed in GUI 112 in response to the user-initiated activity. Region 412 and arrow 416 can appear on top of web page 222 (FIG. 4B) or in a separate pop up window (not shown). One of ordinary skill in the art would recognize other ways to indicate the new location of the feature. In one embodiment, the information region 412 and arrow 416 are superimposed over the display (e.g., in a sub-window of the GUI 112) generated by activation of LinkA 402, thereby partially blocking the user's view of the information produced by the activation of LinkA 402. Furthermore, the user may be required to take a second action, such as clicking or hovering the mouse/pointer over a dialog box 414 within the information region 412 in order to remove the display of the information region 412 and arrow 416, thereby providing the user full access to the information displayed by activation of LinkA 402. The user may be required to take the second action as a method of ensuring that the user has read or viewed the information region 412. As a result, the user will hopefully learn the information displayed in the information region, which may identify the new location of a feature of web page 222, or may identify a change in the functionality of web page 222, or the like.

In some embodiments, the information region 412 and arrow 416 are displayed for a period of time intended to provide notice to the user of the information displayed in the information region 412, such as information about a change in the location of a feature of web page 222. In some embodiments, the period of time for display of the information region 412 may be less than 30 seconds, and in some embodiments the time period may be between 8 and 20 seconds, or between 8 and 15 seconds. In some embodiments, a second user action is required before the system activates the features associated with LinkA 402 or before the user may activate any other features on web page 222. In some embodiments, an acknowledgement region 414 is also generated, where the user can acknowledge the information provided in region 412. In some embodiments, the user is required to perform the second user action at acknowledgement region 414 before the code (i.e., programs, procedures or instructions) embedded in web page 222 enable activation of the feature that the user was attempting to invoke when taking the first action (which resulted in the display of the information region 412).

In some embodiments, the feature of LinkA' 410 is not activated when the user initiates activity in the predefined region associated with LinkA 402. Instead, the user-initiated activity causes the information region 412 and arrow 416 to be displayed (and possibly acknowledgement region 414 as described above) without providing for activation of the feature. In these embodiments, the user is presented with information of the change, but must activate LinkA' in order to activate the feature.

Figure 4C:
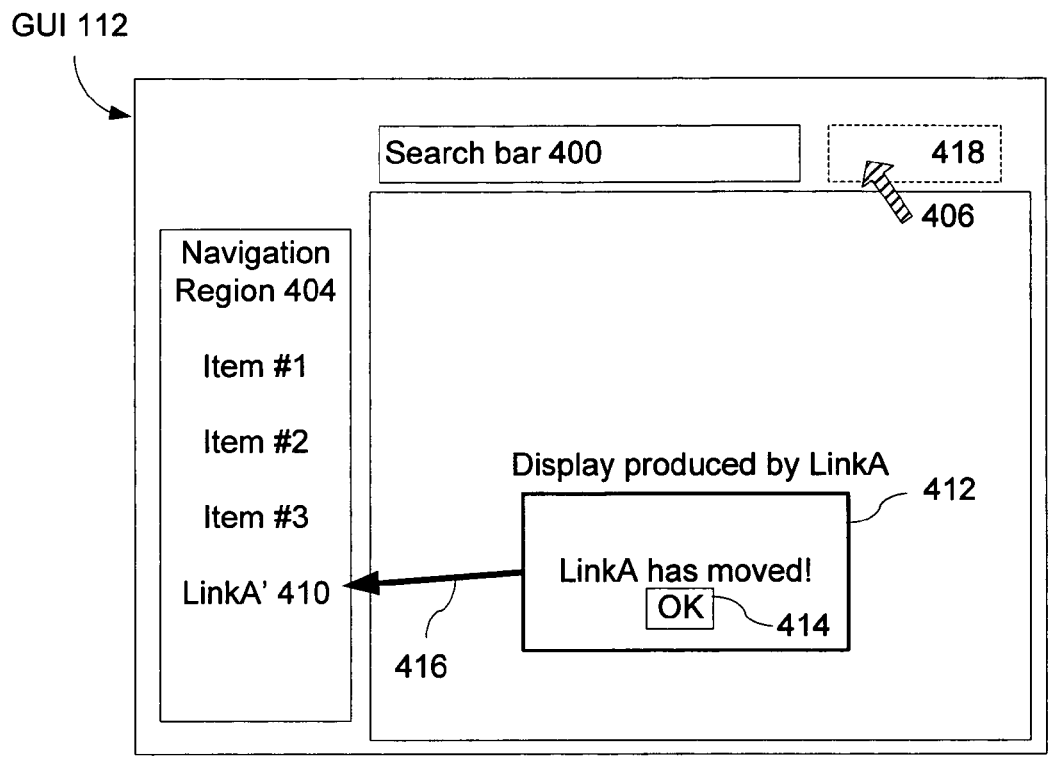
Figure 4D:
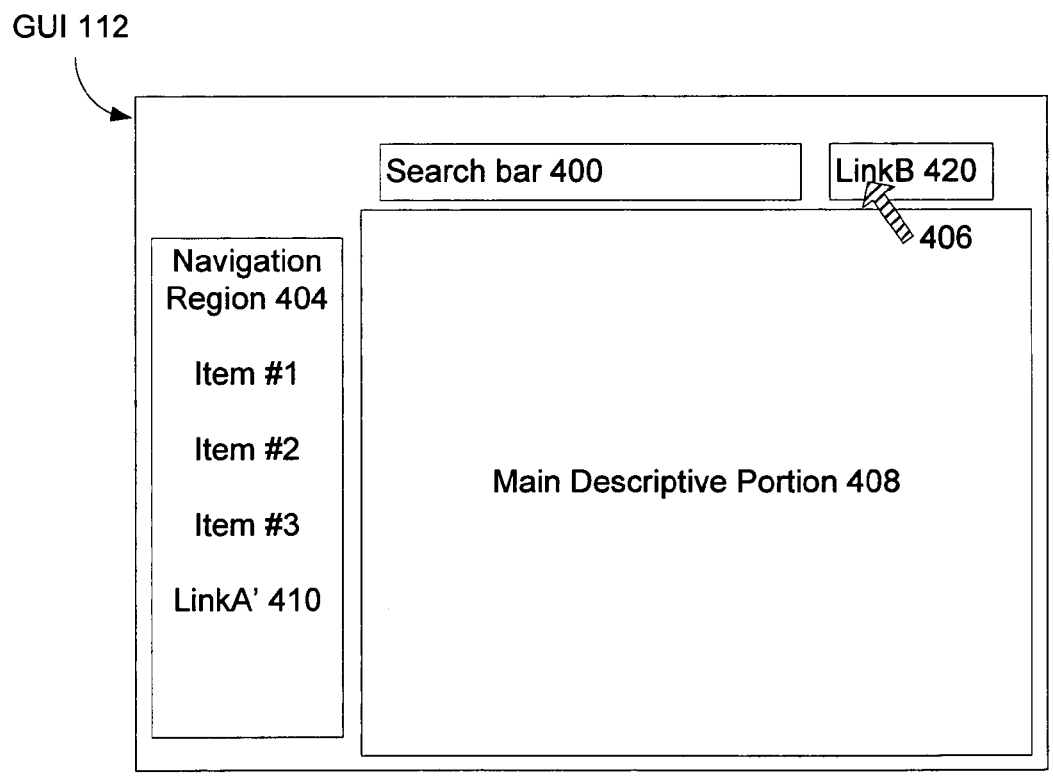

At some point, the visual display associated with LinkA 402 can be removed from the GUI 112 for web page 222 (FIG. 4C). In some embodiments, although the visual display of LinkA 402 is removed from the GUI 112, the code for either executing the LinkA instructions 228 and/or the code for displaying the information region 412 are still executed in response to a predefined user action (e.g., a mouse click or a cursor hover) in or over the predefined region 418 that formerly included a visual display associated with LinkA 402 (FIG. 4C). In some embodiments, when a new web page feature, such as LinkB 420 (FIG. 4D), occupies the region previously occupied by LinkA 402, LinkA instructions 228 are no longer executed and region 412 and arrow 416 no longer appear.

The point in time when LinkA 402 is removed from web page 222 can be decided by a variety of methods. In some embodiments, server 102 can monitor the usage of LinkA instructions 228 by clients 104 and remove LinkA 402 when usage drops by some predetermined amount to indicate that most users have become aware of the change (e.g., because users have switched to using LinkA' 410 instead). In some embodiments, LinkA 402 and/or LinkA instructions 228 can be set to operate for a fixed duration or until a specified date.

Figure 4E:
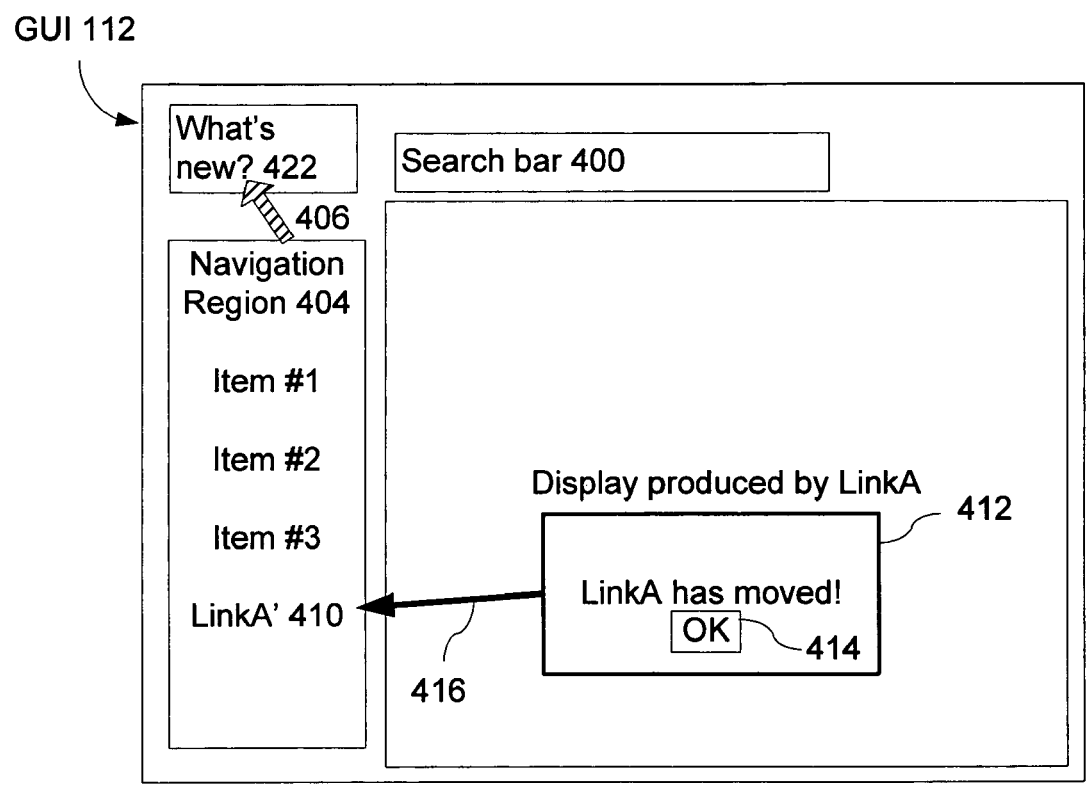

In some embodiments, the predefined region where user-initiated activity causes indication of the modification does not have to appear in the same location as the old feature. For example, the predefined region could be a "Show changes" or "What's new?" region 422 in web page 222 (FIG. 4E). As described earlier, some embodiments may include the acknowledgement region 141 and associated activity and some may not.

Figure 5:
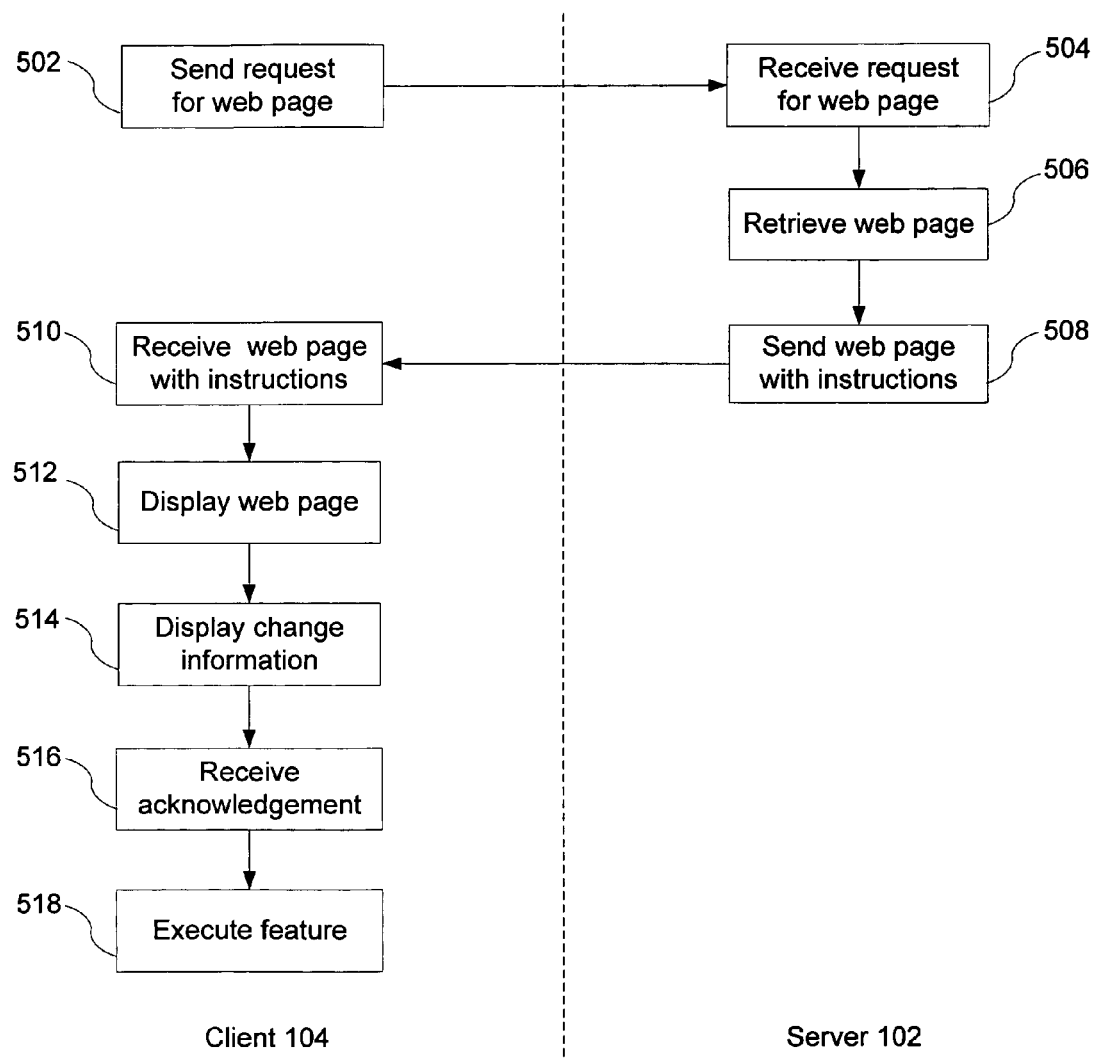
FIG. 5 is a flow chart of an exemplary process for showing uses how a web page has been modified according to an embodiment of the invention.

FIG. 5 is a flow chart of an exemplary process for showing users how a web page has been modified. Client 104 and server 102 perform the process shown in FIG. 5. It will be appreciated by those of ordinary skill in the art that one or more of the acts described may be performed by hardware, software, or a combination thereof, as may be embodied in one or more computing systems.

Client 104 sends a request for a web page (502), such as web page 222, via communications network 106. The request may be sent by several well-known methods, such as by clicking on a link to web page 222 or by entering the Uniform Resource Locator (URL) for web page 222 in web browser 108.

Server 102 receives the request (504), retrieves web page 222 from memory 206 (506), and sends web page 222 back to client 104 via communications network 106

If features in the current version of web page 222 (e.g., the location of navigation regions, search bars, hyperlinks, or form fields or any other web page feature or location that a user might select, e.g., by clicking or hovering) have changed, web page 222 may include information related to at least one of the differences between the current version of web page 222 and a previous version of web page 222. In some embodiments, the information includes instructions that, in response to user-initiated activity within a predefined region of the current version of web page 222, provide information about the modifications.

The source code of a very simple exemplary web page is shown in Table 1. In this example, the hyperlink "Old" represents the position of a feature in a prior version of a web page, while the hyperlink "New" represents the new position of this same feature. The function "doOldLink( )" displays the message "← - - - The link is here now" when a user clicks on the "Old" hyperlink. This message is displayed next to the "New" hyperlink. In addition, clicking on the "Old" hyperlink also causes the doNewLink( ) function to be executed. In this simple example, the doNewLink( ) function just displays the message "Hello World!", but in other examples the doNewLink( ) function would perform a useful task, such as displaying a set of information, or sending a query to a server and retrieving the search result for display. If the user clicks on the "New" hyperlink, that also causes the doNewLink( ) function to be executed. In addition, clicking on the "Refresh" hyperlink causes the original document to be reloaded, thereby removing the messages generated by clicking on the Old or New hyperlinks. As described elsewhere in this document, in other embodiments the informational message may include an alert, dialog box, or the like that the user must click to remove the informational message.

TABLE 1

Source Code of Exemplary Web Page

```
<html>
  <head>
    <title>Web Page Modifications</title>
    <script>
function doNewLink( ) {
      var result = document.getElementById("result");
      result.innerHTML = "Hello World!";
}
function doOldLink( ) {
      doNewLink( );
      showMovedMessage( );
}
function showMovedMessage( ) {
      var message = document.getElementById("message");
      message.innerHTML = "<b><--- The link is here now</b>";
}
    </script>
  </head>
  <body>
    <table width=100% height=100%>
      <tr>
        <td width=50%>
          <a href=javascript:document.location.reload( )>Refresh</a>
        </td>
        <td width=50%>
          <a href=javascript:doOldLink( )>Old</a>
        </td>
      </tr>
      <tr height=50%>
        <td colspan=2 id=result></td>
      </tr>
      <tr>
        <td colspan=2>
          <a href=javascript:doNewLink( )>New</a>
          <span id=message></span></td>
      </tr>
      <tr height=50%></tr>
    </table>
  </body>
</html>
```

Client 104 receives web page 222, which includes LinkA instructions 228 (510), and displays the web page 222 (512). Client 104 responds to user-initiated activity within a predefined region of web page 222, such as LinkA 402, by executing instructions, such as LinkA instructions 228. Instructions 228 cause information, such as information region 412 and arrow 416, to be provided (514) in response to the user-initiated activity. In some embodiments, the user-initiated activity is the user placing (or hovering) cursor 406 within the predefined region. In some embodiments, the user-initiated activity is the user clicking within the predefined region. Information such as region 412 and arrow 416 can appear on top of web page 222 (FIG. 4B) or in a separate pop up window (not shown).

In some embodiments, an acknowledgement region 414 is also displayed in response to the user-initiated activity within the predefined region of web page 222. In some embodiments, client 104 receives an acknowledgement (516) of the information provided in region 412 when the user clicks on region 414. Requiring a user to click on an acknowledgement region, such as region 414, encourages the user to stop using LinkA 402 and start using LinkA' instead.

In some embodiments, in addition to providing information related to changes in web page 222, LinkA instructions 228 also activates LinkA' instructions 230 or functions equivalent to those executed by LinkA' instructions 230 (518). This action saves the user time, but provides less incentive for the user to switch to using LinkA' 410 instead of LinkA 402.

In some embodiments, the server or browser may be configured to determine whether and how often a user has visited a web page. Accordingly, it may use that information to determine whether to present the information indicating the web page modification. For example, the server could choose to not send the version of the web page with the instructions for displaying the information region 412 if the user had previously been presented with web page 222. Instead, the server could send the new version without the additional instructions. In some embodiments, the server could transmit web page 222 with instructions, but disable their effect. In some embodiments, the browser could also determine from visit information that the user had seen the new version of the web page previously and disable the effect of the instructions for displaying the information region 412. In some embodiments, disabling could occur based on a one time previous viewing of the web page with instructions, N times (where N is an integer) of viewing, or based on the expiration of a time period during which the user viewed the web page with the instructions. One of ordinary skill in the art would readily recognize other ways to achieve the same result: at some point after the user has been presented with the web page with the instructions indicating the modification, indications of those modifications would no longer be presented.

The present invention may also be implemented in a voice browser system that interprets voice pages (e.g., VoiceXML programs), similar to the way a graphical browser interprets HTML pages or programs. In particular, when a voice page is modified from a previous version to a current version, the current version of the voice page may be configured to include instructions for responding to a user's voice command that is being phased out, or the meaning of which has been changed, by providing a voice response that instructs the user on the change in the voice page. In some embodiments, the current version of the voice page may include voice instructions, responsive to the aforementioned voice command, on how to access information or a feature that was previously associated with the voice command in the prior version of the voice page. Furthermore, in some embodiments, after playing the voice instructions, a voice browser that is interpreting or executing the current version of the voice page may execute instructions (which are embedded in the current version of the voice page) associated with a new voice command that replaces the "old voice command" spoken by the user.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. The embodiments where chosen and described in order to best explain the principles of the invention and its practical applications, to thereby enable others skilled in the art to best utilize the invention and various embodiments with various modifications as are suited to the particular uses contemplated. However, the illustrative discussions above are not intended to be exhaustive or to limit the invention to the precise forms disclosed. Many modifications and variations are possible in view of the above teachings.

What is claimed is:

1. A computer-implemented method, comprising:
displaying a current version of a web page;
providing a visual indication of a new location for a hyperlink in the current version of the web page as compared to a previous version of the web page, and providing an acknowledgement region, both in response to a user clicking within a predefined region of the current version of the web page, wherein the predefined region is substantially the location of the hyperlink in the previous version of the web page and the acknowledgement region is distinct from both the hyperlink and the predefined region; and
activating the hyperlink in response to a user action within the acknowledgement region.

2. A computer-implemented method, comprising:
displaying a current version of a web page;
detecting a first user action to activate a feature of the web page, wherein the first user action occurs at a former location of the feature in a previous version of the page, the feature includes executable program instructions that are executed when the feature is activated, and the feature has a current location in the current version of the web page that is distinct from the former location of the feature in the previous version of the web page; and
upon detecting the first user action, activating the feature and displaying update information related to differences between the previous version of the web page and the current version of the web page over at least a portion of the new web page, the information being generated by activation of the feature.

3. The method of claim 2, further comprising removing the display of the update information only in response to a second user action.

4. The method of claim 3, wherein the second user action is identified by the displayed update information.

5. A computer-implemented method, comprising:
displaying a current version of a document; and
providing information in response to a mouse hover within a first predefined region of the current version of the document;
wherein the first predefined region is substantially the location of a feature in a previous version of the document; and
wherein the feature appears at only one location in the current version of the document and the location of the feature in the current version of the document is distinct from the location of the feature in the previous version of the document; and
wherein the information comprises information pointing out the location of the feature in the current version of the document.

6. The method of claim 5, wherein the information is displayed on the current version of the document.

7. The method of claim 5, wherein the information is provided in a pop up window.

8. The method of claim 5, wherein the document is a web page.

9. The method of claim 5, wherein the feature is a hyperlink.

10. The method of claim 9, further comprising:
performing at least one activity associated with the feature in response to receiving a second user-initiated activity within a second predefined region of a display.

11. The method of claim 10, wherein the second user-initiated activity comprises clicking within the second predefined region.

12. A computer-implemented method, comprising:
receiving a request to obtain a current version of a document;
obtaining the current version of the document, the document including instructions for providing information in response to a mouse hover within a predefined region of the current version of the document;
wherein the predefined region is substantially the location of a feature in a previous version of the document; and
wherein the feature appears at only one location in the current version of the document and the location of the feature in the current version of the document is distinct from the location of the at least one feature in the previous version of the document; and
wherein the information comprises information pointing out the location of the feature in the current version of the document; and
sending the document to a remote computer.

13. The method of claim 12, wherein the document is a web page.

14. A computer, wherein said computer is configured to:
display a current version of a document; and
provide information in response to a mouse hover within a predefined region of the current version of the document;
wherein the predefined region is substantially the location of a feature in a previous version of the document; and
wherein the feature appears at only one location in the current version of the document and the location of the feature in the current version of the document is distinct from the location of the feature in the previous version of the document; and
wherein the information comprises information pointing out the location of the feature in the current version of the document.

15. The computer of claim 14, wherein the document is a web page.

16. A system comprising at least one server, wherein said at least one server is configured to:
receive a request to obtain a current version of a document;
obtain the current version of the document, the document including instructions for providing information in response to a mouse hover within a predefined region of the current version of the document;
wherein the predefined region is substantially the location of a feature in a previous version of the document; and
wherein the feature appears at only one location in the current version of the document and the location of the feature in the current version of the document is distinct from the location of the feature in the previous version of the document; and
wherein the information comprises information pointing out the location of the feature in the current version of the document; and
send the document to a remote computer.

17. The system of claim 16, wherein the document is a web page.

18. A machine readable medium having stored thereon data representing sequences of instructions, which when executed by a server, cause said server to:
receive a request to obtain a current version of a document;
obtain the current version of the document, the document including instructions for providing information in response to a mouse hover within a predefined region of the current version of the document;
wherein the predefined region is substantially the location of a feature in a previous version of the document; and wherein the feature appears at only one location in the current version of the document and the location of the feature in the current version of the document is distinct from the location of the feature in the previous version of the document; and wherein the information comprises information pointing out the location of the feature in the current version of the document; and send the document to a remote computer.

19. The machine readable medium of claim 18, wherein the document is a web page.

20. A machine readable medium having stored thereon data representing sequences of instructions, which when executed by a client, cause said client to:

display a current version of a document; and provide information in response to a mouse hover within a predefined region of the current version of the document;

wherein the predefined region is substantially the location of a feature in a previous version of the document; and wherein the feature appears at only one location in the current version of the document and the location of the feature in the current version of the document is distinct from the location of the feature in the previous version of the document; and wherein the information comprises information pointing out the location of the feature in the current version of the document.

21. The machine readable medium of claim 20, wherein the document is a web page.

22. A system, comprising:

means for displaying a current version of a document; and means for providing information in response to a mouse hover within a first predefined region of the current version of the document;

wherein the first predefined region is substantially the location of a feature in a previous version of the document; and wherein the feature appears at only one location in the current version of the document and the location of the feature in the current version of the document is distinct from the location of the at least one feature in the previous version of the document; and wherein the information comprises information pointing out the location of the feature in the current version of the document; and wherein the current version of the document and the information are stored on computer-readable media.

23. A system comprising at least one server, wherein said at least one server is configured to:

receive a request to obtain a current version of a web page;

obtain the current version of the web page, the web page including instructions to provide a visual indication of a new location for a hyperlink in the current version of the web page as compared to a previous version of the web page, and provide an acknowledgement region, both in response to a user clicking within a predefined region of the current version of the web page, wherein the predefined region is substantially the location of the hyperlink in the previous version of the web page and the acknowledgement region is distinct from both the hyperlink and the predefined region; and to activate the hyperlink in response to a user action within the acknowledgement region; and send the web page to a remote computer.

24. A graphical user interface on a computer comprising:

a current version of a web page stored on a computer-readable medium, said web page configured to provide a visual indication of a new location for a hyperlink in the current version of the web page as compared to a previous version of the web page, and provide an acknowledgement region, both in response to a user clicking within a first predefined region of the current version of the web page, wherein the predefined region is substantially the location of the hyperlink in the previous version of the web page and the acknowledgement region is distinct from both the hyperlink and the predefined region; and to activate the hyperlink in response to a user action within the acknowledgement region.

25. A system comprising at least one server, wherein said at least one server is configured to:

receive a request to obtain a current version of a web page;

obtain the current version of the web page, the web page including instructions to display the current version of a web page;

to detect a user action to activate a feature of the web page, wherein the user action occurs at a former location of the feature in a previous version of the web, the feature includes executable program instructions that are executed when the feature is activated, and the feature has a current location in the current version of the web page that is distinct from the former location of the feature in the previous version of the web page; and upon detecting the user action, to activate the feature and display update information related to differences between the previous version of the web page and the current version of the web page over at least a portion of the new web page, the information being generated by activation of the feature; and send the web page to a remote computer.

26. A graphical user interface on a computer comprising:

a current version of a web page stored on a computer-readable medium, said web page configured to detect a user action to activate a feature of the web page, wherein the user action occurs at a former location of the feature in a previous version of the page, the feature includes executable program instructions that are executed when the feature is activated, and the feature has a current location in the current version of the web page that is distinct from the former location of the feature in the previous version of the web page; and upon detecting the user action, to activate the feature and display update information related to differences between the previous version of the web page and the current version of the web page over at least a portion of the new web page, the information being generated by activation of the feature.

* * * * *